(12) United States Patent
Biwaki et al.

(10) Patent No.: US 12,370,637 B2
(45) Date of Patent: Jul. 29, 2025

(54) SCREW TIGHTENING SYSTEM, CONTROLLER, AND NON-TRANSITORY STORAGE MEDIUM

(71) Applicant: OMRON Corporation, Kyoto (JP)

(72) Inventors: Shu Biwaki, Kyoto (JP); Zhiqiang Liu, Kyoto (JP); Masahiro Murai, Kyoto (JP); Yuki Tsuchihashi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 157 days.

(21) Appl. No.: 18/163,395

(22) Filed: Feb. 2, 2023

(65) Prior Publication Data

US 2023/0271282 A1  Aug. 31, 2023

(30) Foreign Application Priority Data

Feb. 28, 2022 (JP) ................................ 2022-029619

(51) Int. Cl.
  *B23P 19/06* (2006.01)
(52) U.S. Cl.
  CPC ................................ *B23P 19/066* (2013.01)
(58) Field of Classification Search
  CPC ......... B23P 19/066; B23P 19/06; B23P 19/00; B25B 23/147; B25B 21/002; B25B 21/008; G05B 2219/45091; B25J 9/1679; B25J 9/1674; G05D 17/02
  USPC ....................................................... 29/407.02
  See application file for complete search history.

(56) References Cited

U.S. PATENT DOCUMENTS

| | | | | |
|---|---|---|---|---|
| 4,361,945 A * | 12/1982 | Eshghy | ................. | B23P 19/066 173/183 |
| 4,894,767 A * | 1/1990 | Doniwa | ................. | B23P 19/066 73/862.24 |
| 2006/0241815 A1* | 10/2006 | Carlin | ..................... | B25B 23/14 700/275 |
| 2008/0230245 A1* | 9/2008 | Matsunaga | ........... | B25B 23/147 173/4 |
| 2015/0336248 A1* | 11/2015 | Goe | ........................ | B25B 21/00 173/180 |
| 2018/0200872 A1* | 7/2018 | Leong | .................... | B25B 21/002 |
| 2020/0150615 A1* | 5/2020 | Jousset | ................. | B25B 21/004 |
| 2021/0199416 A1 | 7/2021 | Boisard et al. | | |

(Continued)

FOREIGN PATENT DOCUMENTS

| | | |
|---|---|---|
| EP | 169 668 A1 | 4/2023 |
| JP | 2020-163500 A | 10/2020 |
| JP | 2022-1399 A | 1/2022 |

OTHER PUBLICATIONS

Extended European Search Report dated Jul. 26, 2023 in Application No. 23152747.4.

*Primary Examiner* — Sarang Afzali
*Assistant Examiner* — Darrell C Ford
(74) *Attorney, Agent, or Firm* — Sughrue Mion, PLLC (57) ABSTRACT

A screw tightening system includes an actuator including a driver bit that rotationally drives a screw and a motor coupled with driver bit, and a controller that controls actuator. Controller includes an acquirer that acquires torque values of a torque generated in a motor, a calculator that calculates a standard deviation of the torque values in a temporary tightening period, and a determiner that determines that there is an abnormality when a ratio of the standard deviation to a reference standard deviation exceeds a first threshold value.

11 Claims, 9 Drawing Sheets

(56) References Cited

U.S. PATENT DOCUMENTS

| | | | |
|---|---|---|---|
| 2021/0229283 A1* | 7/2021 | Kobayashi | B25J 9/163 |
| 2022/0111496 A1* | 4/2022 | Beacham, Jr. | B25B 21/008 |
| 2023/0022323 A1* | 1/2023 | Cho | G01L 5/24 |
| 2023/0234175 A1 | 7/2023 | Sugioka et al. | |
| 2024/0421731 A1* | 12/2024 | Malmgren | B25B 23/14 |

* cited by examiner

SCREW TIGHTENING SYSTEM, CONTROLLER, AND NON-TRANSITORY STORAGE MEDIUM

BACKGROUND OF THE INVENTION

Field of the Invention

The present invention relates to a screw tightening system, a controller, and a non-transitory storage medium.

Description of the Background Art

A technique for automating a screw tightening operation by using a screw tightening device is known. For example, Japanese Patent Laying-Open No. 2020-163500 discloses a screw tightening device capable of detecting an abnormality that has occurred while a screw is being tightened.

SUMMARY OF THE INVENTION

The screw tightening device disclosed in Japanese Patent Laying-Open No. 2020-163500 determines that there is an abnormality when a torque value of a torque acting on a screw while the screw is being tightened exceeds a threshold value. In general, the torque value of the torque acting on the screw depends on a size and material of the screw, a tightening torque and rotation speed of a driver bit, and individual differences of other equipment. Therefore, in a method of comparing the torque value of the torque acting on the screw with a threshold value, it is necessary to change the threshold value or set the threshold value to a higher value in accordance with the size and material of the screw, the tightening torque and rotation speed of the driver bit, and the individual differences of other equipment. When the threshold value is set high, there is a possibility that the detection of a screw tightening abnormality is delayed.

The present invention provides a solution capable of more reliably detecting a screw tightening abnormality in a temporary tightening period from when a screw engages with a screw hole until when the screw is seated in the screw hole.

A screw tightening system according to an aspect of the present invention includes an actuator including a driver bit configured to rotationally drive a screw and a motor coupled with the driver bit, and a controller configured to control the actuator. The controller includes an acquirer configured to acquire torque values of a torque generated in the motor, a calculator configured to calculate a standard deviation of the torque values acquired in a temporary tightening period from when the screw engages with a screw hole until when the screw is seated in the screw hole, and a determiner configured to determine that there is an abnormality when a ratio of the standard deviation to a reference standard deviation exceeds a first threshold value.

This configuration determines whether an abnormality has occurred by the ratio of the standard deviation d of the torque value in the temporary tightening period to the reference standard deviation. That is, variation in the torque value in the temporary tightening period is relatively evaluated. Thus, since there is no need to worry about the size and material of the screw, the tightening torque and rotation speed of the driver bit, and individual differences of other equipment in setting of the threshold value, there is no need to set the threshold value high. Therefore, this configuration can detect the screw tightening abnormality more reliably in the temporary tightening period.

The controller may further include a commander that commands the motor to stop when it is determined that there is an abnormality. In this configuration, since the screw tightening operation is stopped when it is determined that there is an abnormality, it is possible to suppress breakage of the screw or the screw hole.

The acquirer may acquire each of the torque values at a predetermined cycle, and the calculator may start calculation of the standard deviation when the torque value is acquired a first predetermined number of times or more in the temporary tightening period. This configuration enhances reliability of the standard deviation calculated by the calculator, and thus enhances accuracy of the detection of the screw tightening abnormality.

The calculator may calculate the standard deviation by using the torque values acquired for all number of times from a start of the temporary tightening period to a present time. This configuration enhances the reliability of the standard deviation calculated by the calculator, and thus enhances the accuracy of the detection of the screw tightening abnormality.

The calculator may calculate the standard deviation by using the torque values for a latest second predetermined number of times. This configuration enhances the reliability of the standard deviation calculated by the calculator, and thus enhances the accuracy of the detection of the screw tightening abnormality.

The reference standard deviation may be calculated based on the torque values acquired for all number of times in the temporary tightening period when the screw is considered to be normally tightened to the screw hole. This configuration enhances the reliability of the reference standard deviation.

The reference standard deviation may be an average value of standard deviations each of which is calculated based on the torque values acquired for a third predetermined number of times in the temporary tightening period when the screw is considered to be normally tightened to the screw hole. This configuration enhances the reliability of the reference standard deviation.

The determiner may select one from a plurality of reference standard deviations prepared in advance depending on at least one of a size of the screw, a material of the screw, and a material of the screw hole. This configuration enhances the reliability of the reference standard deviation.

The determiner may select one from a plurality of first threshold values prepared in advance depending on at least one of the size of the screw, the material of the screw, and the material of the screw hole. This configuration enhances the accuracy of the detection of the screw tightening abnormality.

The actuator may further include a load sensor configured to detect a load generated in the driver bit, and the determiner may determine that there is an abnormality when the load detected by the load sensor exceeds a second threshold value. This configuration enhances the accuracy of the detection of the screw tightening abnormality.

A controller according to another aspect of the present invention controls an actuator including a driver bit configured to rotationally drive a screw and a motor coupled with the driver bit. The controller includes an acquirer configured to acquire torque values of a torque generated in the motor, a calculator configured to calculate a standard deviation of the torque values acquired in a temporary tightening period from when the screw engages with a screw hole until when the screw is seated in the screw hole, and a determiner configured to determine that there is an abnormality when a ratio of the standard deviation to a reference standard deviation exceeds a first threshold value.

This configuration determines whether an abnormality has occurred by the ratio of the standard deviation of the torque value in the temporary tightening period to the reference standard deviation. That is, variation in the torque value in the temporary tightening period is relatively evaluated. Thus, since there is no need to worry about the size and material of the screw, the tightening torque and rotation speed of the driver bit, and individual differences of other equipment in setting of the threshold value, there is no need to set the threshold value high. Therefore, this configuration can detect the screw tightening abnormality more reliably in the temporary tightening period.

A non-transitory storage medium according to another aspect of the present invention stores a control program causing one or more processors of a computer connected to an actuator including a driver bit configured to rotationally drive a screw and a motor coupled with the driver bit, when executed by the one or more processors, to acquire torque values of a torque generated in the motor, to calculate a standard deviation of the torque values acquired in a temporary tightening period from when the screw engages with a screw hole until when the screw is seated in the screw hole, and to determine that there is an abnormality when a ratio of the standard deviation to a reference standard deviation exceeds a first threshold value.

This configuration determines whether an abnormality has occurred by the ratio of the standard deviation of the torque value in the temporary tightening period to the reference standard deviation. That is, variation in the torque value in the temporary tightening period is relatively evaluated. Thus, since there is no need to worry about the size and material of the screw, the tightening torque and rotation speed of the driver bit, and individual differences of other equipment in setting of the threshold value, there is no need to set the threshold value high. Therefore, this configuration can detect the screw tightening abnormality more reliably in the temporary tightening period.

The above and other objects, features, aspects and advantages of the present invention will become apparent from the following detailed description of the present invention to be understood in conjunction with the accompanying drawings.

DESCRIPTION OF THE PREFERRED EMBODIMENTS

Hereinafter, an embodiment of the present invention will be described with reference to the drawings. The same or corresponding parts in the drawings are denoted by the same reference signs, and the description thereof will not be repeated.

A. Application Example

First, an example of a situation to which the present invention is applied will be described.

Figure 1:
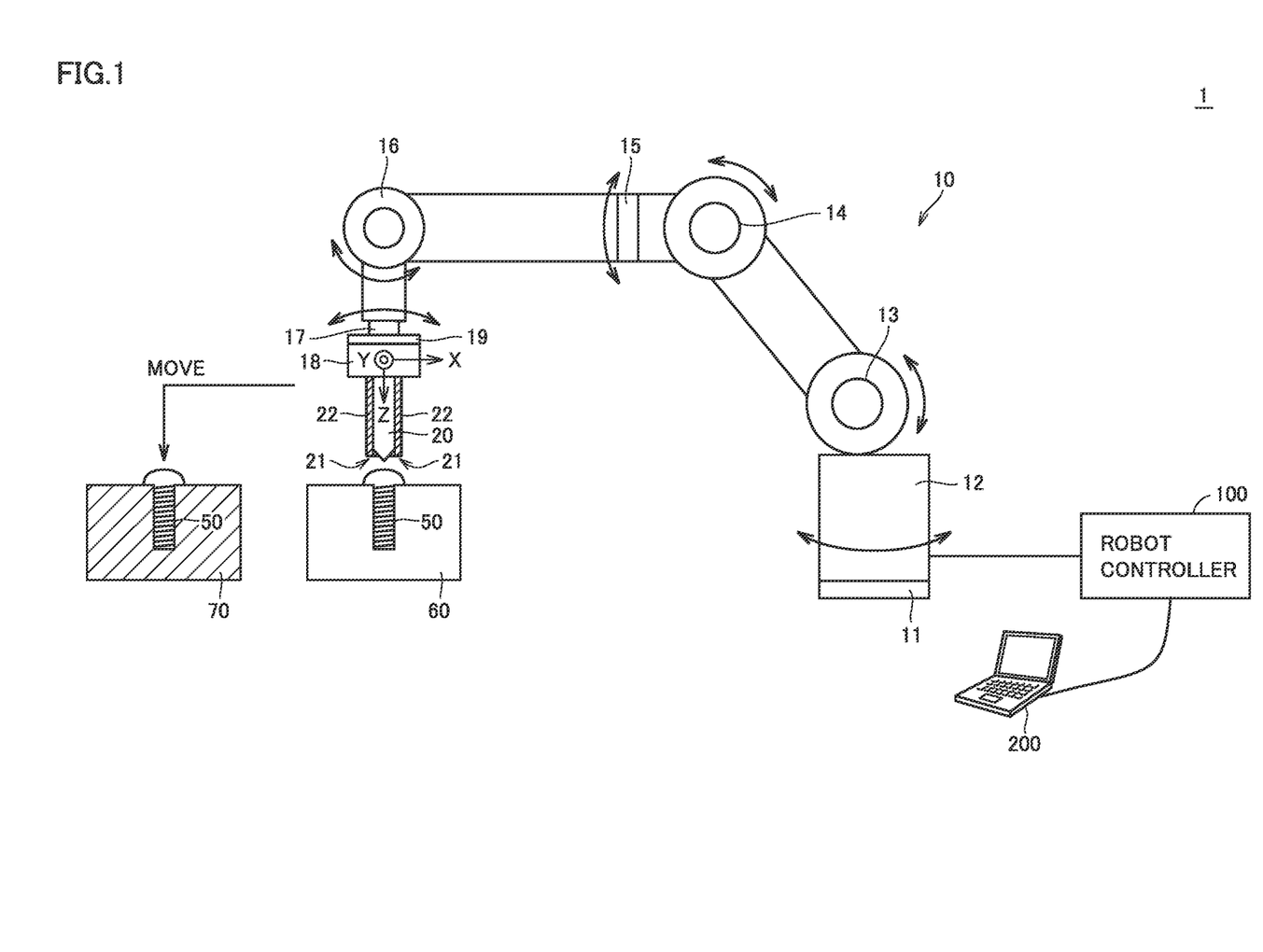
FIG. 1 is a diagram illustrating an outline of a screw tightening system 1 according to an embodiment.

FIG. 1 is a diagram illustrating an outline of a screw tightening system 1 according to the embodiment. Referring to FIG. 1, screw tightening system 1 includes an articulated robot (hereinafter simply referred to as a "robot 10") and a robot controller 100 that controls robot 10. Robot 10 is an example of an "actuator". Robot controller 100 is an example of a "controller".

In screw tightening system 1, a screw feeder 60 sequentially feeds a screw 50 to a predetermined position. Robot 10 of screw tightening system 1 picks screw 50 fed by screw feeder 60. Robot 10 conveys picked screw 50 to a position of a workpiece 70, and tightens screw 50 in a screw hole 72 (see FIG. 3) provided in the workpiece 70.

Robot 10 includes a base 11 and a plurality of movable portions 12, 13, 14, 15, 16, and 17. Movable portions 12, 13, 14, 15, 16, and 17 correspond to joints of robot 10. Each of movable portions 12, 13, 14, 15, 16, and 17 drives a link constituting robot 10 along a rotation axis as shown in FIG. 1. An end effector 18 is attached to a distal end of an arm of robot 10. Any tool distal end jig can be attached to end effector 18.

In a configuration example shown in FIG. 1, a driver bit 20 that rotationally drives screw 50 is rotatably attached to end effector 18. Furthermore, a rotating motor 37 (see FIG. 2) that rotationally drives driver bit 20 and a lifting motor 38 (see FIG. 2) that moves driver bit 20 upward and downward are mechanically coupled to driver bit 20. As an example of a mechanism for driver bit 20 to hold screw 50, an adsorbing sleeve 22 is provided on an outer periphery of driver bit 20. An opening 21 of adsorbing sleeve 22 is provided near a distal end of driver bit 20. Adsorbing sleeve 22 communicates with an ejector 39 (see FIG. 2), and adsorbs screw 50 by a negative pressure generated by ejector 39. On a path from ejector 39 to adsorbing sleeve 22, a pressure sensor 28 (see FIG. 2) that detects a gauge pressure of the path is provided.

The mechanism for holding screw 50 on driver bit 20 adsorbs screw 50 by negative pressure. However, the mechanism for holding screw 50 on driver bit 20 is not limited to the configuration by adsorption (negative pressure), and a configuration using magnetic force or the like may be used.

A load sensor 19 that detects a load generated in end effector 18 and a tool distal end jig (such as driver bit 20) is provided in a portion where end effector 18 is attached to the arm of robot 10. Load sensor 19 outputs a detection result indicating a magnitude of the generated load and a direction in which the load is generated. The detection result of load sensor 19 may be output in a form of a kind of vector.

In the following description, an operation of robot 10 will be mainly described on the basis of a coordinate system XYZ (hereinafter also referred to as a "TCP coordinate system") based on the end effector 18. In the TCP coordinate system, an axial direction of driver bit 20 corresponds to a Z axis. That is, Z axis corresponds to a direction in which driver bit 20 presses screw 50.

Specifically, load sensor 19 outputs, as detection results, a load in an X-axis direction (X), a load in a Y-axis direction (Y), and a load in a Z-axis direction (Z) in the TCP coordinate system, and outputs a load (moment) in a rotational direction (RX) about an X axis, a load (moment) in a rotational direction (RY) about a Y axis, and a load (moment) in a rotational direction (RZ) about Z axis.

An information processing device 200 may be connected to robot controller 100. Information processing device 200 is typically a general-purpose computer, and presents information from robot controller 100 to a user and gives instruction by the user to robot controller 100 in accordance with an operation by the user.

B. Hardware Configuration Example of Screw Tightening System 1

Figure 2:
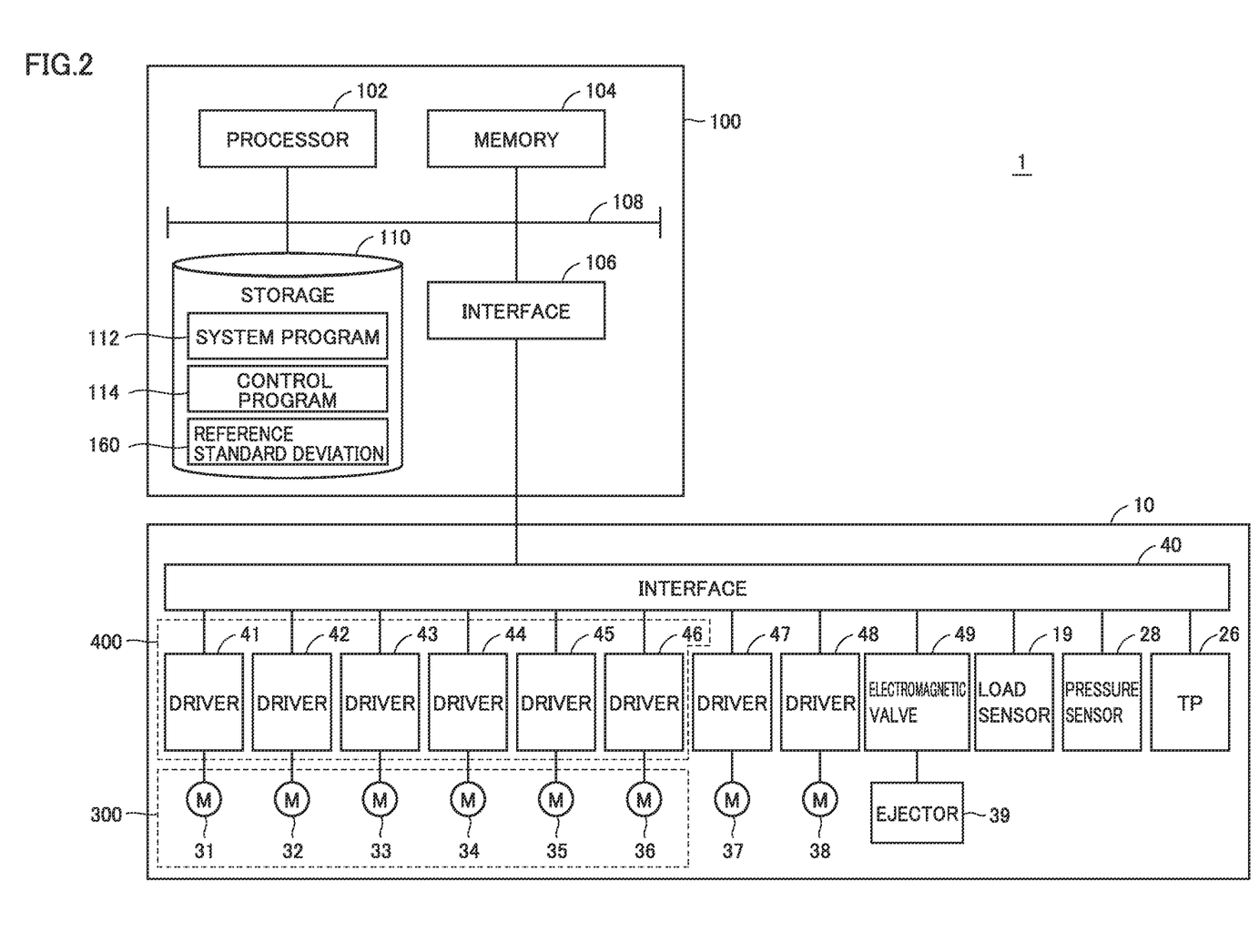
FIG. 2 is a schematic diagram illustrating a hardware configuration example of screw tightening system 1 according to the embodiment.

FIG. 2 is a schematic diagram illustrating a hardware configuration example of screw tightening system 1 according to the embodiment. Referring to FIG. 2, robot 10 includes motors 31, 32, 33, 34, 35, and 36 respectively associated with movable portions 12, 13 14, 15, 16, and 17, and drivers 41, 42, 43, 44, 45, and 46 respectively driving motors 31, 32, 33, 34, 35, and 36. In the following description, motors 31, 32, 33, 34, 35, and 36 are collectively referred to as a "joint motor 300". In addition, drivers 41, 42, 43, 44, 45, and 46 are collectively referred to as a "driver 400".

Robot 10 includes rotating motor 37 that rotationally drives driver bit 20 and a driver 47 that drives rotating motor 37. Robot 10 includes lifting motor 38 that moves driver bit 20 upward and downward and a driver 48 that drives lifting motor 38. Rotating motor 37 and lifting motor 38 are mechanically coupled to driver bit 20.

Robot 10 includes ejector 39 that generates a negative pressure, and an electromagnetic valve 49 that controls on and off of generation of the negative pressure by ejector 39.

Drivers 41, 42, 43, 44, 45, 46, 47, and 48, electromagnetic valve 49, load sensor 19, pressure sensor 28, and a teaching pendant 26 are electrically connected to robot controller 100 via an interface 40. Teaching pendant 26 performs teaching or the like of robot 10 in response to the operation by the user. Teaching pendant 26 may be configured to be detachable from robot 10.

Robot controller 100 is a type of computer, and includes a processor 102, a memory 104, an interface 106, and a storage 110 as main hardware components. These components are connected via a bus 108.

Processor 102 includes typically a central processing unit (CPU), a micro-processing unit (MPU), or the like. Memory 104 typically includes a volatile storage device such as a dynamic random access memory (DRAM) or a static random access memory (SRAM). Storage 110 typically includes a non-volatile storage device such as a solid state disk (SSD) or a flash memory. Storage 110 stores a system program 112 for performing basic processing and a control program 114. Control program 114 includes computer-readable instructions for controlling robot 10. Processor 102 reads system program 112 and control program 114 stored in storage 110, develops system program 112 and control program 114 in memory 104, and executes system program 112 and control program 114 to perform processing for controlling robot 10 as described later.

Interface 106 is responsible for exchanging signals and/or data between robot controller 100 and robot 10. In screw tightening system 1, commands for controlling drivers 41, 42, 43, 44, 45, 46, 47, and 48 and electromagnetic valve 49 are transmitted from robot controller 100 to robot 10, and respective detection results by load sensor 19 and pressure sensor 28 are transmitted from robot 10 to robot controller 100. In screw tightening system 1, driver 47 calculates a torque value of a torque generated in rotating motor 37. The torque value calculated by driver 47 is transmitted from robot 10 to robot controller 100.

Although FIG. 2 illustrates the configuration example in which necessary processing is provided by processor 102 executing the programs, some or all of the provided processing may be implemented by using a dedicated hardware circuit (for example, an application specific integrated circuit (ASIC), a field-programmable gate array (FPGA), or the like).

Although FIG. 2 illustrates an example in which robot controller 100 is configured independently of robot 10, some or all of the functions and processing provided by robot controller 100 may be incorporated in robot 10. In this case, robot controller 100 may be mounted as a controller dedicated to robot control, or may be implemented by using a general-purpose programmable logic controller (PLC) or a personal computer.

Furthermore, some or all of the functions and processing provided by robot controller 100 may be achieved by using computing resources on a network referred to as a so-called cloud.

When a vertical articulated robot is used as the actuator, the robot ascends and descends driver bit 20, and thus lifting motor 38 and driver 48 described above are unnecessary. On the other hand, when the vertical articulated robot is not used as the actuator, lifting motor 38 and driver 48 are necessary as described above.

In addition, the configuration including robot 10 has been described as an example of the "actuator", but the "actuator" is not required to include robot 10. The "actuator" may be a screw tightening device including driver bit 20, rotating motor 37, driver 47, lifting motor 38, and driver 48.

As described above, screw tightening system 1 according to the embodiment may be implemented in any manner.

C. Screw Tightening Operation by Screw Tightening System 1

Next, with reference to FIGS. 3 and 4, a screw tightening operation by screw tightening system 1 according to the embodiment will be described.

Figure 3:
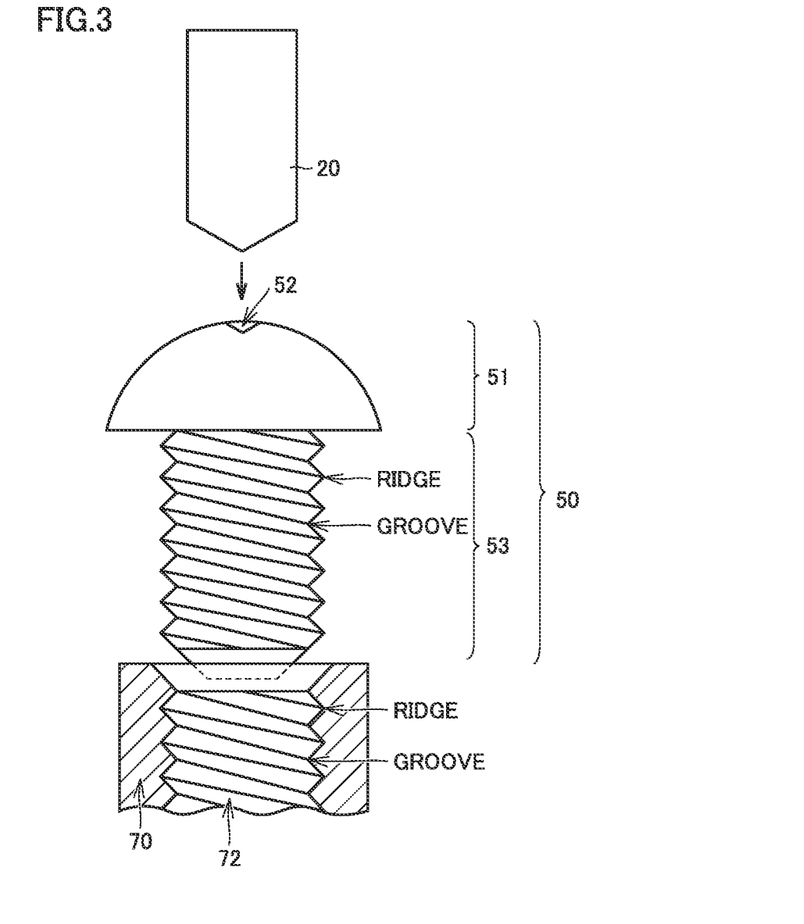
FIG. 3 is a diagram illustrating an example of shapes of a screw and a screw hole.

FIG. 3 is a diagram illustrating an example of shapes of the screw and the screw hole. Referring to FIG. 3, the screw 50 includes a head 51 and a screw portion 53. Head 51 is provided with a hole 52 into which driver bit 20 is inserted. Head 51 prevents screw 50 from being excessively screwed into screw hole 72. Screw portion 53 includes a plurality of ridges and a plurality of grooves. Screw hole 72 provided in workpiece 70 also includes a plurality of ridges and a plurality of grooves. Screw 50 is rotated by a torque applied from driver bit 20. As screw 50 descends in screw hole 72 while rotating, the ridges of screw portion 53 engages with the ridges of screw hole 72, and the grooves of screw portion 53 engages with the grooves of screw hole 72. As a result, screw 50 and screw hole 72 engage with each other.

Figure 4A:
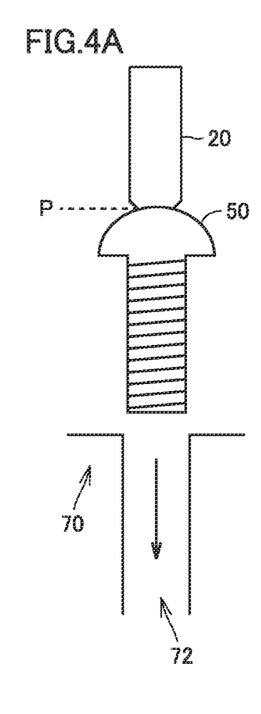
FIG. 4A is a diagram illustrating a state in which driver bit 20 is located at a screw tightening start position P.

FIGS. 4A to 4D are diagrams illustrating an example of the screw tightening operation by screw tightening system 1. FIG. 4A is a diagram illustrating a state in which driver bit 20 is located at a screw tightening start position P. Screw tightening start position P is a position at which driver bit 20 starts the screw tightening operation, that is, a position at which the rotation of screw 50 is started. Robot controller 100 controls joint motor 300 and lifting motor 38 so that driver bit 20 reaches screw tightening start position P. As a result, driver bit 20 picks screw 50 from screw feeder 60 (see FIG. 1), and moves to screw tightening start position P while holding screw 50.

When driver bit 20 reaches screw tightening start position P, robot controller 100 controls rotating motor 37 and lifting motor 38 so that driver bit 20 rotates and descends under a rotation condition and a descent condition for a preparation period. As a result, screw 50 descends toward screw hole 72 while rotating. In the embodiment, the preparation period is a period from when the rotation of driver bit 20 starts until when screw 50 and screw hole 72 engage with each other for the first time.

Figure 4B:
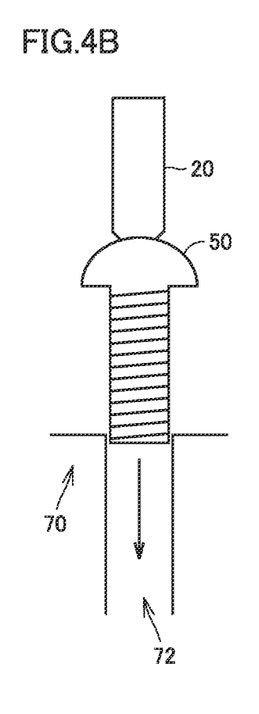
FIG. 4B is a diagram illustrating a state in which screw 50 and screw hole 72 engage with each other for the first time.

FIG. 4B is a diagram illustrating a state in which screw 50 and screw hole 72 engage with each other for the first time. When screw 50 and screw hole 72 engage with each other for the first time, the preparation period ends and a temporary tightening period starts. In the embodiment, the temporary tightening period is a period from when screw 50 engages with screw hole 72 provided in workpiece 70 until when screw 50 is seated in screw hole 72.

In the temporary tightening period, robot controller 100 controls rotating motor 37 and lifting motor 38 so that driver bit 20 rotates and descends under a rotation condition and a descent condition for the temporary tightening period. Specifically, in the temporary tightening period, robot controller 100 controls rotating motor 37 and lifting motor 38 so that driver bit 20 rotates at high speed with a torque smaller than a torque in a full tightening period described later. As a result, screw 50 is temporarily tightened in screw hole 72.

Figure 4C:
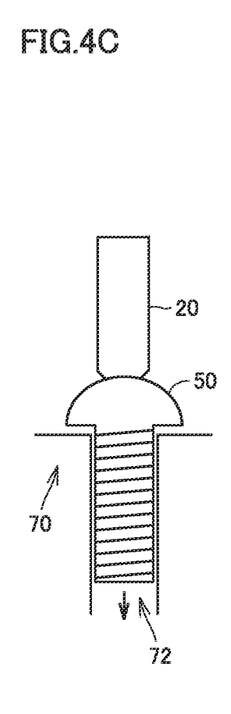
FIG. 4C is a diagram illustrating a state in which screw 50 is seated in screw hole 72.

FIG. 4C is a diagram illustrating a state in which screw 50 is seated in screw hole 72. When screw 50 is seated in screw hole 72, the temporary tightening period ends and the full tightening period starts. In the full tightening period, robot controller 100 controls rotating motor 37 and lifting motor 38 so that driver bit 20 rotates and descends under a rotation condition and a descent condition for the full tightening period. Specifically, in the full tightening period, robot controller 100 controls rotating motor 37 and lifting motor 38 so that driver bit 20 rotates slowly with a torque greater than the torque in the temporary tightening period. As a result, screw 50 is fully tightened in screw hole 72.

Figure 4D:
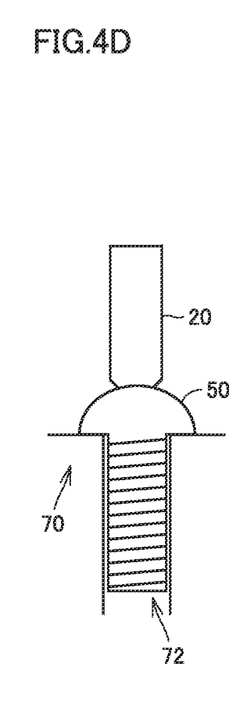
FIG. 4D is a diagram illustrating a state in which screw 50 is fully tightened in screw hole 72.

FIG. 4D is a diagram illustrating a state in which screw 50 is fully tightened in screw hole 72. When the screw 50 is fully tightened to screw hole 72, the full tightening period ends, and robot controller 100 controls rotating motor 37 and lifting motor 38 to stop the rotation and descent of driver bit 20. Accordingly, the rotation and descent of driver bit 20 stop, and as a result, the rotation and descent of screw 50 also stop.

D. Problems in Screw Tightening Operation

Next, with reference to FIG. 5, problems to be solved by screw tightening system 1 according to the embodiment will be described.

Figure 5:
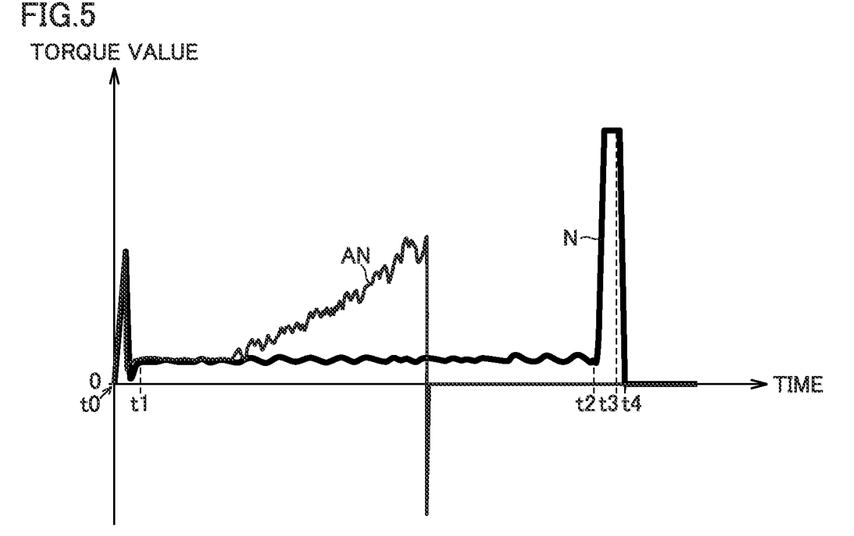
FIG. 5 is a diagram illustrating an example of transition of a torque value when the screw tightening operation is normal and an example of transition of a torque value when the screw tightening operation is abnormal.

FIG. 5 is a diagram illustrating an example of transition of the torque value when the screw tightening operation is normal and an example of transition of the torque value when the screw tightening operation is abnormal.

Referring to FIG. 5, a horizontal axis indicates an elapsed time from the start of the screw tightening operation. That is, the horizontal axis indicates an elapsed time from the start of rotation of driver bit 20 that has reached screw tightening start position P. A vertical axis indicates the torque value of the torque generated in rotating motor 37. A thick line (line N) indicates an example of transition of the torque value when the screw tightening operation is normal. A thin line (line AN) indicates an example of transition of the torque value when the screw tightening operation is abnormal.

Timing t0 to t1 indicate the preparation period. Timing t1 to t2 indicate the temporary tightening period. Timing t2 to t3 indicate the full tightening period. Timing t3 to t4 is a period in which the torque applied to screw 50 is released.

As shown in FIG. 5, when the screw tightening operation is normal, the torque value of the torque generated in rotating motor 37 fluctuates in the temporary tightening period, but the fluctuation is not large. On the other hand, when the screw tightening operation is abnormal, the torque value of the torque generated in rotating motor 37 increases with time in the temporary tightening period. Therefore, when the screw tightening operation is abnormal, the torque value of the torque generated in rotating motor 37 in the temporary tightening period fluctuates more than when the screw tightening operation is normal. This is because screw 50 and screw hole 72 do not engage with each other in the temporary tightening period.

As described above, in the temporary tightening period, screw 50 rotates at high speed. Therefore, time for the screw tightening operation is reduced. On the other hand, in the temporary tightening period, screw 50 and screw hole 72 do not engage with each other, and there is a high possibility that the screw tightening fails. That is, in the temporary tightening period, there is a high possibility that screw 50 is obliquely tightened or screw 50 is burned on workpiece 70. When torque is continuously applied to screw 50 from driver bit 20 in a state where screw 50 is obliquely tightened or in a state where screw 50 is burnt onto workpiece 70, screw 50 and workpiece 70 can be damaged. Therefore, more reliable detection of a screw tightening abnormality in the temporary tightening period is a problem in automation of screw tightening operation.

In general, the torque value of the torque acting on screw 50 depends on a size and material of screw 50, a tightening torque and rotation speed of driver bit 20, and a type and movement speed of robot 10. Therefore, in a method of comparing the torque value of the torque acting on screw 50 with a threshold value, it is necessary to change the threshold value or set the threshold value to a higher value in accordance with the size and material of screw 50, the tightening torque and rotation speed of driver bit 20, and the type and movement speed of robot 10. When the threshold value is set high, there is a problem that the detection of a screw tightening abnormality is delayed.

On the other hand, screw tightening system 1 according to the embodiment has a structure capable of more reliably detecting a screw tightening abnormality.

E. Detection of Screw Tightening Abnormality

Next, processing of detecting a screw tightening abnormality by screw tightening system 1 according to the embodiment will be described.

e1: Outline

Figure 6:
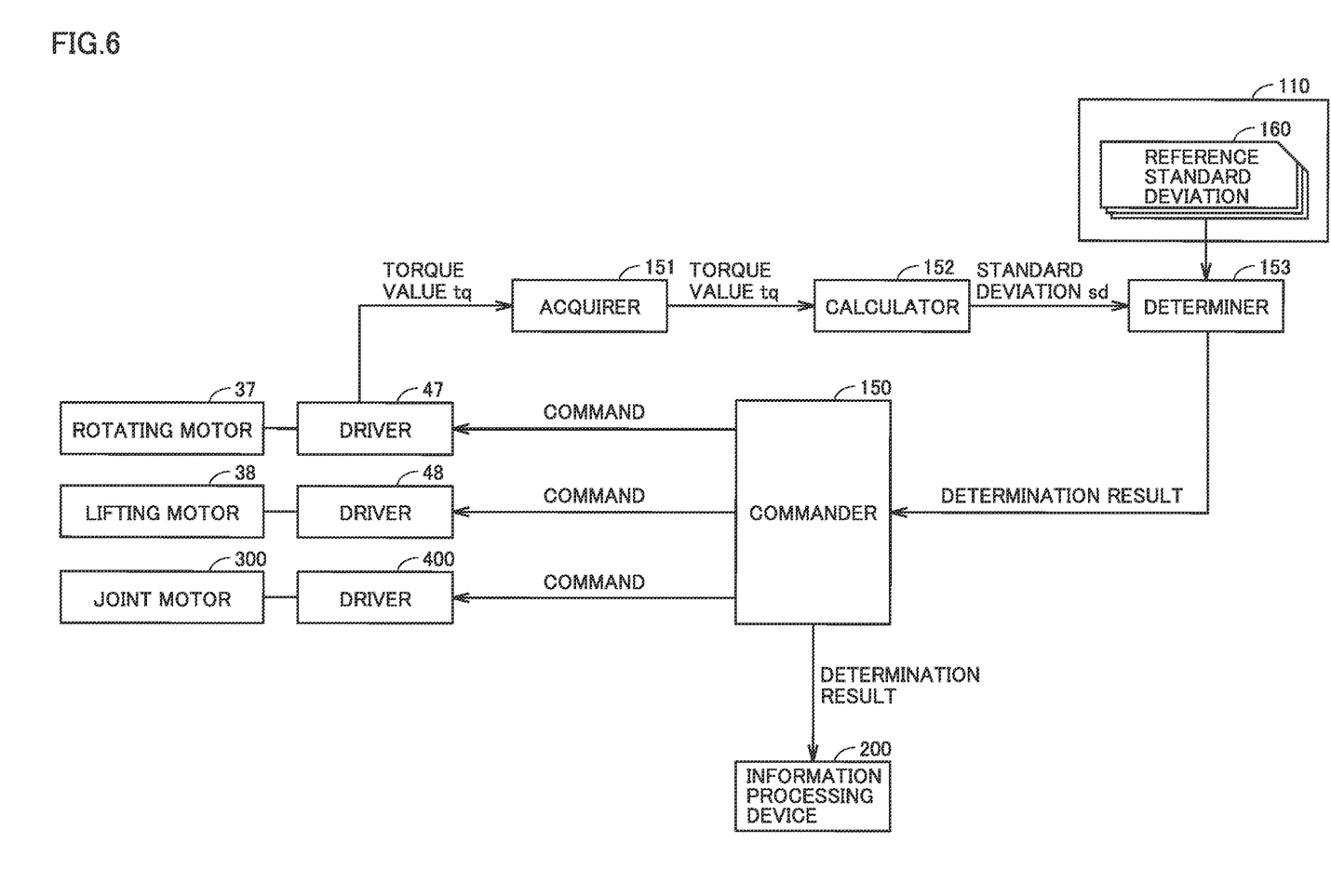
FIG. 6 is a diagram for describing an outline of processing of detecting a screw tightening abnormality by screw tightening system 1 according to the embodiment.

FIG. 6 is a diagram for describing an outline of the processing of detecting a screw tightening abnormality by screw tightening system 1 according to the embodiment. A commander 150, an acquirer 151, a calculator 152, and a determiner 153 are implemented by processor 102 executing system program 112 and control program 114.

Commander 150 outputs a drive command and a stop command of rotating motor 37 to driver 47. Driver 47 controls driving of rotating motor 37 in response to the command received from commander 150. As a result, driver bit 20 rotates or stops. When commander 150 is to stop rotating motor 37, commander 150 may be configured not to output a drive command to driver 47 instead of outputting a stop command to driver 47.

Commander 150 outputs a drive command and a stop command of lifting motor 38 to driver 48. Driver 48 controls driving of lifting motor 38 in response to the command received from commander 150. As a result, driver bit 20 ascends or descends. When commander 150 is to stop lifting motor 38, commander 150 may be configured not to output a drive command to driver 48 instead of outputting a stop command to driver 48.

Commander 150 outputs a drive command and a stop command of joint motor 300 to driver 400. Driver 400 controls driving of joint motor 300 in response to the command received from commander 150. As a result, driver bit 20 moves back and forth between above screw feeder 60 and above workpiece 70. When commander 150 is to stop joint motor 300, commander 150 may be configured not to output a drive command to driver 400 instead of outputting a stop command to driver 400.

Commander 150 outputs a current status in the screw tightening operation to driver 47, driver 48, driver 400, acquirer 151, calculator 152, and determiner 153. The current status in the screw tightening operation includes the preparation period, the temporary tightening period, and the full tightening period.

When the temporary tightening period is started, acquirer 151 acquires torque values tq of the torque generated in rotating motor 37 from driver 47. In the following description, the torque value(s) of the torque generated in rotating motor 37 is(are) also simply referred to as "torque value(s) tq". Driver 47 calculates torque value tq. Acquirer 151 preferably acquires torque value tq at a predetermined cycle. Acquirer 151 may acquire torque value tq from driver 47 from the start of the screw tightening operation.

Calculator 152 calculates standard deviation sd of torque values tq acquired by acquirer 151 in the temporary tightening period. When acquirer 151 acquires torque value tq a first predetermined number of times or more in the temporary tightening period, calculator 152 preferably starts calculating standard deviation sd of torque values tq. As an example, when acquirer 151 acquires torque value tq 100 times or more in the temporary tightening period, calculator 152 starts calculating standard deviation sd of torque values tq.

As an example of a method of calculating standard deviation sd, calculator 152 calculates standard deviation sd by using torque values tq acquired for all the number of times by acquirer 151 from the start of the temporary tightening period to the present time. For example, when torque value tq is acquired 110 times by acquirer 151 from the start of the temporary tightening period to the present time, calculator 152 calculates standard deviation sd by using torque values tq for the 110 times.

As another example of the method of calculating standard deviation sd, calculator 152 may calculate standard deviation sd by using torque values tq for the latest second predetermined number of times acquired by acquirer 151. For example, when torque value tq is acquired 110 times by acquirer 151 from the start of the temporary tightening period to the present time, calculator 152 calculates the standard deviation by using torque values tq for the latest 100 times. Note that the first predetermined number of times and the second predetermined number of times may be the same or different.

Determiner 153 calculates a ratio of standard deviation sd calculated by calculator 152 to a reference standard deviation 160. When the ratio of standard deviation sd calculated by calculator 152 to reference standard deviation 160 exceeds a first threshold value, determiner 153 determines that there is an abnormality.

That is, determiner 153 determines that there is an abnormality when the following Formula 1 is satisfied.

$$sd/\text{Ref} > TH \quad \text{(Formula 1)}$$

"sd" in Formula 1 represents the standard deviation calculated by calculator 152, "Ref" in Formula 1 represents reference standard deviation 160, and "TH" in Formula 1 represents the first threshold value.

Reference standard deviation 160 is stored in storage 110. Reference standard deviation 160 is calculated on the basis of torque values tq acquired by acquirer 151 in the temporary tightening period when screw 50 is considered to be normally tightened to screw hole 72. In the following description, the temporary tightening period when screw 50 is considered to be normally tightened to screw hole 72 is also referred to as a "normal temporary tightening period".

As an example, reference standard deviation 160 may be a standard deviation of torque values tq acquired for all the number of times in the normal temporary tightening period. As another example, reference standard deviation 160 may be an average value of standard deviations each of which is calculated based on the torque values tq acquired for a third predetermined number of times by acquirer 151 in the normal temporary tightening period.

When determining that there is an abnormality, determiner 153 outputs a determination result to commander 150. When receiving the determination result from determiner 153, commander 150 outputs a stop command of rotating motor 37 to driver 47 to stop the rotation of driver bit 20. When receiving the determination result from determiner 153, commander 150 outputs a stop command of lifting motor 38 to driver 48 to stop the descent of driver bit 20. As a result, the driving of rotating motor 37 and lifting motor 38 is stopped, and thus, the rotation and the descent of driver bit 20 are stopped. Then, the rotation and the descent of screw 50 are also stopped.

Thereafter, commander 150 outputs a drive command of lifting motor 38 to driver 48 so that driver bit 20 releases screw 50 and ascends. As a result, driver bit 20 releases screw 50 and ascends to a predetermined position. The user then removes screw 50 from screw hole 72.

Note that robot 10 may remove screw 50 from screw hole 72. In this case, commander 150 outputs a drive command of rotating motor 37 to driver 47 and outputs a drive command of lifting motor 38 to driver 48 so that driver bit 20 ascends while holding screw 50 and reversely rotating. As a result, screw 50 is removed from screw hole 72.

In addition, after screw 50 is removed from screw hole 72, commander 150 may command driver 47, driver 48, and driver 400 to resume the screw tightening operation or redo the screw tightening operation.

When receiving the determination result from determiner 153, commander 150 may output the determination result to information processing device 200. When receiving the determination result from commander 150, information processing device 200 may notify that the screw tightening abnormality has occurred. As an example of a notification method, in a case where information processing device 200 includes a display, the occurrence of the screw tightening abnormality may be displayed on the display. As another example of the notification method, in a case where information processing device 200 includes a speaker, the occurrence of the screw tightening abnormality may be notified by outputting a sound from the speaker. The sound output from the speaker may be a notification sound or a voice.

Only one reference standard deviation 160 may be prepared, or a plurality of reference standard deviations may be prepared. In a case where a plurality of reference standard deviations are prepared in advance, determiner 153 selects one from the plurality of reference standard deviations prepared in advance depending on at least one of the size of screw 50, the material of screw 50, and the material of screw hole 72. The size of screw 50 includes at least one of a size of a diameter of head 51 (see FIG. 3) and a length of screw portion 53 (see FIG. 3). The material of screw 50 is, for example, iron, stainless steel, aluminum, resin, or the like. The material of screw hole 72 is, for example, iron, stainless steel, aluminum, resin, or the like.

Only one first threshold value may be prepared, or a plurality of first threshold values may be prepared. In a case where a plurality of first threshold values is prepared in advance, determiner 153 selects one from the plurality of first threshold values prepared in advance depending on at least one of the size of screw 50, the material of screw 50, and the material of screw hole 72.

(e2: Procedure of Processing)

Figure 7:
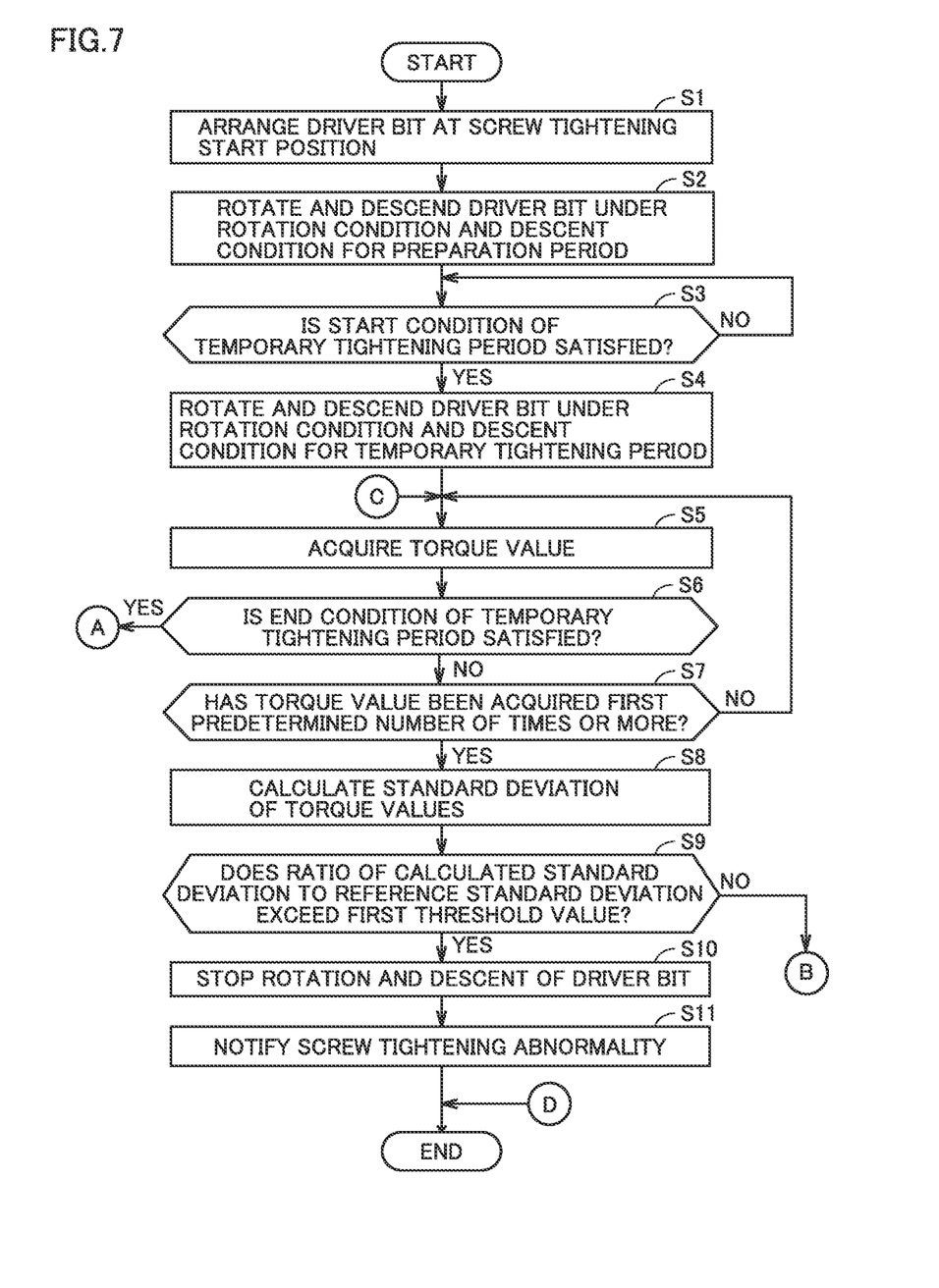
FIGS. 7 and 8 are flowcharts illustrating a procedure of processing for screw tightening executed by screw tightening system 1 according to the embodiment.
Figure 8:
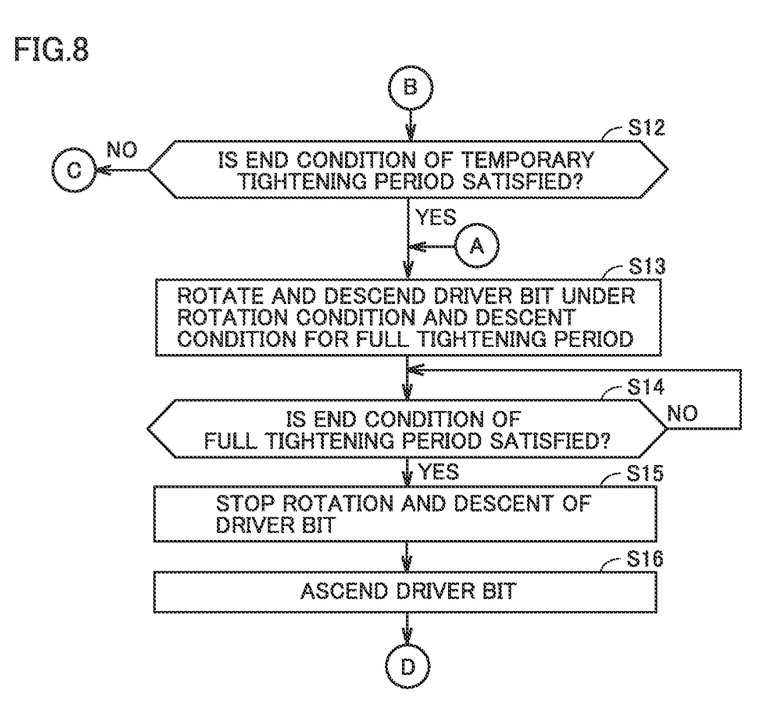

FIGS. 7 and 8 are flowcharts illustrating a procedure of processing for screw tightening executed by screw tightening system 1 according to the embodiment. FIGS. 7 and 8 illustrate a part of a control method for controlling robot 10. Each step shown in FIGS. 7 and 8 is typically implemented by processor 102 of robot controller 100 executing control program 114. As a result, a command is given from robot controller 100 to robot 10, and thus the processing shown in FIGS. 7 and 8 is implemented.

In step S1, robot controller 100 controls joint motor 300 and lifting motor 38 to arrange driver bit 20 at screw tightening start position P.

In step S2, robot controller 100 controls rotating motor 37 and lifting motor 38 to rotate and descend driver bit 20 under the rotation condition and the descent condition for the preparation period.

In step S3, robot controller 100 determines whether a start condition of the temporary tightening period is satisfied. Robot controller 100 determines that the start condition of the temporary tightening period is satisfied on the basis of the elapsed time from the start of the rotation of driver bit 20. When torque value tq is acquired from the start of the screw tightening operation, robot controller 100 may determine that the start condition of the temporary tightening period is satisfied on the basis of a change in torque value tq. When determining that the start condition of the temporary tightening period is satisfied (YES in step S3), robot controller 100 advances the processing to step S4.

In step S4, robot controller 100 controls rotating motor 37 and lifting motor 38 to rotate and descend driver bit 20 under the rotation condition and the descent condition for the temporary tightening period.

In step S5, robot controller 100 acquires torque value tq.

In step S6, robot controller 100 determines whether an end condition of the temporary tightening period is satisfied. As an example, robot controller 100 determines that the end condition of the temporary tightening period is satisfied on the basis of the elapsed time from the start of the rotation of driver bit 20. When determining that the end condition of the temporary tightening period is satisfied (YES in step S6), robot controller 100 advances the processing to step S13. On the other hand, when determining that the end condition of the temporary tightening period is not satisfied (NO in step S6), robot controller 100 advances the processing to step S7.

In step S7, robot controller 100 determines whether torque value tq has been acquired the first predetermined number of times or more. When determining that torque value tq has been acquired the first predetermined number of times or more (YES in step S7), robot controller 100 advances the processing to step S8. On the other hand, when determining that torque value tq has not been acquired the first predetermined number of times or more (NO in step S7), robot controller 100 returns the processing to step S5.

In step S8, robot controller 100 calculates standard deviation sd of torque values tq.

In step S9, robot controller 100 determines whether the ratio of standard deviation sd calculated in step S8 to reference standard deviation 160 exceeds the first threshold value. When determining that the ratio of standard deviation sd calculated in step S8 to reference standard deviation 160 exceeds the first threshold value (YES in step S9), robot controller 100 advances the processing to step S10. On the other hand, when determining that the ratio of standard deviation sd calculated in step S8 to reference standard deviation 160 does not exceed the first threshold value (NO in step S9), robot controller 100 advances the processing to step S12.

In step S10, robot controller 100 controls rotating motor 37 and lifting motor 38 to stop the rotation and the descent of driver bit 20.

In step S11, robot controller 100 notifies the screw tightening abnormality. As an example, robot controller 100 commands information processing device 200 to notify the screw tightening abnormality. When receiving the command from robot controller 100, information processing device 200 notifies that the screw tightening abnormality has occurred.

In step S12, robot controller 100 determines whether an end condition of the temporary tightening period is satisfied. The processing of step S12 is similar to the processing of step S6. When determining that the end condition of the temporary tightening period is satisfied (YES in step S12), robot controller 100 advances the processing to step S13. On the other hand, when determining that the end condition of the temporary tightening period is not satisfied (NO in step S12), robot controller 100 returns the processing to step S5.

In step S13, robot controller 100 controls rotating motor 37 and lifting motor 38 to rotate and descend driver bit 20 under the rotation condition and the descent condition for the full tightening period.

In step S14, robot controller 100 determines whether an end condition of the full tightening period is satisfied. As an example, robot controller 100 determines that the end condition of the full tightening period is satisfied on the basis of an elapsed time from the end of the temporary tightening period. When determining that the end condition of the full tightening period is satisfied (YES in step S14), robot controller 100 advances the processing to step S15.

In step S15, robot controller 100 controls rotating motor 37 and lifting motor 38 to stop the rotation and the descent of driver bit 20.

In step S16, robot controller 100 controls lifting motor 38 to ascend driver bit to a predetermined position.

After step S11 or S16, the processing for screw tightening ends.

After step S11, the user may remove screw 50 from screw hole 72, or robot 10 may remove screw 50 from screw hole 72. After screw 50 is removed from screw hole 72, robot 10 may resume the screw tightening operation or redo the screw tightening operation from the beginning in accordance with the control of robot controller 100.

As described above, screw tightening system 1 according to the embodiment determines whether an abnormality has occurred by the ratio of standard deviation sd of torque values tq in the temporary tightening period to reference standard deviation 160. That is, variation in torque value tq in the temporary tightening period is relatively evaluated. Thus, since there is no need to worry about the size and material of screw 50, the tightening torque and rotation speed of driver bit 20, individual differences of other equipment, and the like in setting of the threshold value, there is no need to set the threshold value high. Therefore, screw tightening system 1 according to the embodiment can detect the screw tightening abnormality more reliably in the temporary tightening period.

In screw tightening system 1 according to the embodiment, since standard deviation sd of torque values tq of the torque generated in rotating motor 37 in the temporary tightening period is used to detect a screw tightening abnormality, reference standard deviation 160 and the first threshold value can be fixed values without depending on the size of screw 50, the material of the screw 50, and the material of screw hole 72. Therefore, screw tightening system 1 according to the embodiment can reduce time and effort required for measuring reference standard deviation 160 and adjusting the first threshold value.

Note that screw tightening system 1 may be configured such that the user can change the first threshold value. As an example, information processing device 200 receives an operation of changing the first threshold value and transmits a command corresponding to the received operation of changing to robot controller 100. Robot controller 100 changes the first threshold value in response to the command. As a result, in a case where abnormality detection is excessively performed or a failure rate of abnormality detection is high, the user can optimize the detection of a screw tightening abnormality by adjusting the first threshold value. The user preferably adjusts the first threshold value on the basis of the standard deviation of torque values tq of the torque generated in rotating motor 37 in the temporary tightening period when screw 50 is considered not to be normally tightened to screw hole 72.

F. Modification

In a case where the "actuator" includes load sensor 19 as in robot 10 described above, determiner 153 (see FIG. 6) may also determine that there is an abnormality when the load in Z-axis direction (direction Z shown in FIG. 1) detected by load sensor 19 exceeds the second threshold value.

Figure 9:
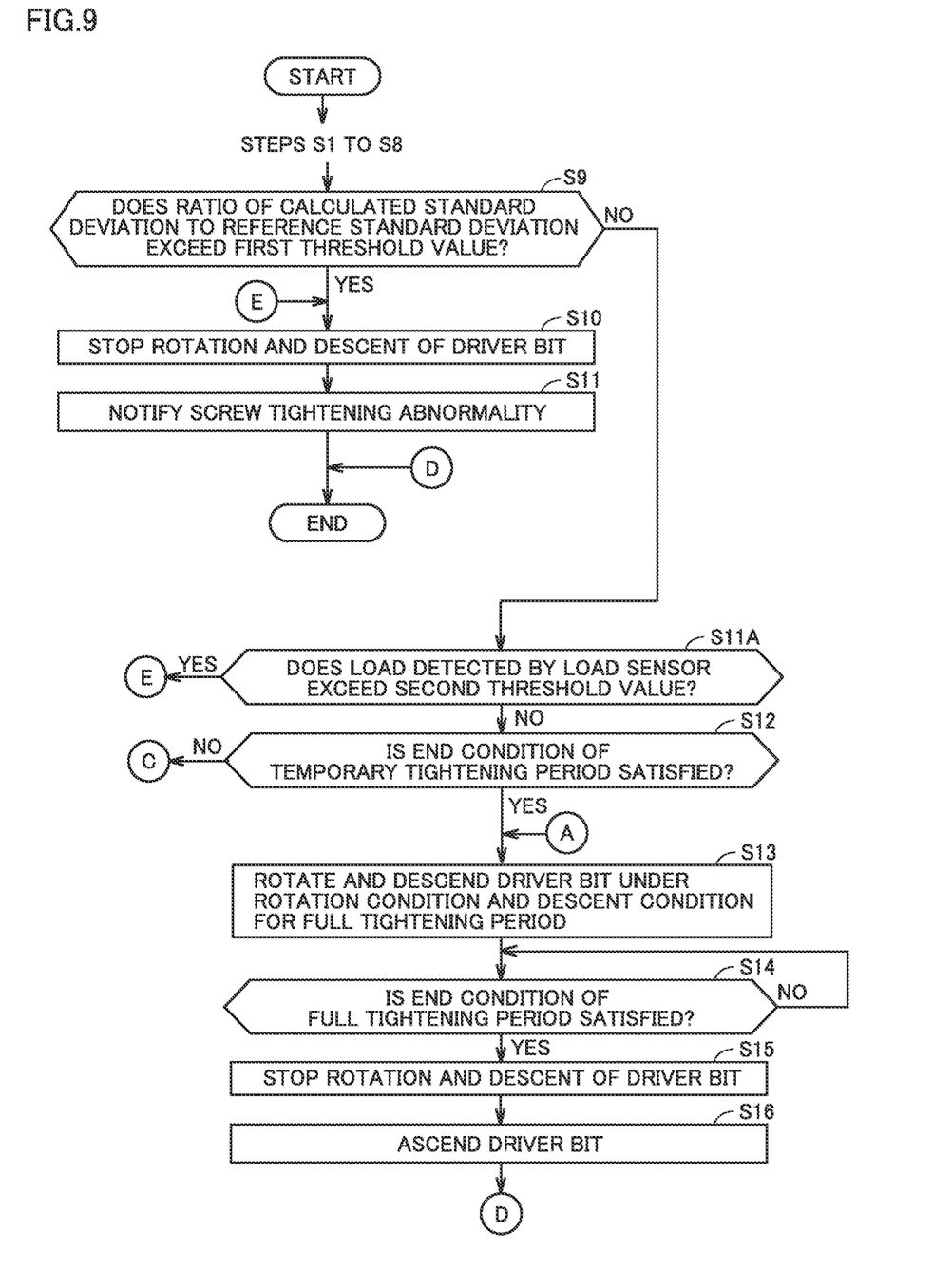
FIG. 9 is a flowchart illustrating a modification of the procedure of the processing for screw tightening executed by screw tightening system 1 according to the embodiment.

FIG. 9 is a flowchart illustrating a modification of the procedure of the processing for screw tightening executed by screw tightening system 1 according to the embodiment. In the flowchart of FIG. 9, the processing of step S11A is added to the flowcharts of FIGS. 7 and 8. Of the processing shown in FIG. 9, processing similar to the processing shown in FIGS. 7 and 8 are denoted by the same step numbers, and the description thereof will not be repeated.

When determining in step S9 that the ratio of standard deviation sd calculated in step S8 to reference standard deviation 160 does not exceed the first threshold value (NO in step S9), robot controller 100 advances the processing to step S11A.

In step S11A, robot controller 100 determines whether the load in Z-axis direction detected by load sensor 19 exceeds the second threshold value. When determining that the load in Z-axis direction detected by load sensor 19 exceeds the second threshold value (YES in step S11A), robot controller 100 advances the processing to step S10. On the other hand, when determining that the load in Z-axis direction detected by load sensor 19 does not exceed the second threshold value (NO in step S11A), robot controller 100 advances the processing to step S12.

As described above, the screw tightening system 1 according to the modification determines that there is an abnormality when the ratio of standard deviation sd of the torque generated in rotating motor 37 in the temporary tightening period to reference standard deviation 160 exceeds the first threshold value. Therefore, as in the embodiment, screw tightening system 1 according to the modification can detect the screw tightening abnormality more reliably in the temporary tightening period.

Furthermore, screw tightening system 1 according to the modification also determines that there is an abnormality when the load in Z-axis direction detected by load sensor 19 exceeds the second threshold value. When a load in Z-axis direction exceeding the second threshold value is generated in driver bit 20, it is considered that a screw tightening abnormality has occurred. Therefore, screw tightening system 1 according to the modification performs not only the determination based on standard deviation sd of the torque generated in rotating motor 37 in the temporary tightening period but also the determination based on the load in Z-axis direction generated in driver bit 20. Thus, accuracy of the detection of a screw tightening abnormality is enhanced.

G. Appendix

The above embodiment includes the following technical ideas.

Configuration 1

A screw tightening system including:
an actuator (10) including a driver bit (20) configured to rotationally drive a screw (50) and a motor (37) coupled with the driver bit (20); and
a controller (100) configured to control the actuator (10), in which
the controller (100) includes
an acquirer (151) configured to acquire torque values of a torque generated in the motor (37),
a calculator (152) configured to calculate a standard deviation of the torque values acquired in a temporary tightening period from when the screw (50) engages with a screw hole (72) until when the screw (50) is seated in the screw hole (72), and a determiner (153) configured to determine that there is an abnormality when a ratio of the standard deviation to a reference standard deviation exceeds a first threshold value.

Configuration 2

The screw tightening system according to configuration 1, in which the controller (100) further includes a commander (150) that commands the motor (37) to stop when it is determined that there is an abnormality.

Configuration 3

The screw tightening system according to configuration 1 or 2, in which
the acquirer (151) acquires each of the torque values at a predetermined cycle, and
the calculator (152) starts calculation of the standard deviation when the torque value is acquired a first predetermined number of times or more in the temporary tightening period.

Configuration 4

The screw tightening system according to configuration 3, in which the calculator (152) calculates the standard deviation by using the torque values acquired for all number of times from a start of the temporary tightening period to a present time.

Configuration 5

The screw tightening system according to configuration 3, in which the calculator (152) calculates the standard deviation by using the torque values for a latest second predetermined number of times.

Configuration 6

The screw tightening system according to any one of configurations 1 to 5, in which the reference standard deviation is calculated based on the torque values acquired for all number of times in the temporary tightening period when the screw (50) is considered to be normally tightened to the screw hole (72).

Configuration 7

The screw tightening system according to any one of configurations 1 to 5, in which the reference standard deviation is an average value of standard deviations each of which is calculated based on the torque values acquired for a third predetermined number of times in the temporary tightening period when the screw (50) is considered to be normally tightened to the screw hole (72).

Configuration 8

The screw tightening system according to any one of configurations 1 to 7, in which the determiner (153) selects one from a plurality of reference standard deviations prepared in advance depending on at least one of a size of the screw (50), a material of the screw (50), and a material of the screw hole (72).

Configuration 9

The screw tightening system according to any one of configurations 1 to 8, in which the determiner (153) selects one from a plurality of first threshold values prepared in advance depending on at least one of the size of the screw (50), the material of the screw (50), and the material of the screw hole (72).

Configuration 10

The screw tightening system according to any one of configurations 1 to 9, in which
the actuator (10) further includes a load sensor (19) configured to detect a load generated in the driver bit (20), and
the determiner (153) determines that there is an abnormality when the load detected by the load sensor (19) exceeds a second threshold value.

Configuration 11

A controller (100) configured to control an actuator (10) including a driver bit (20) configured to rotationally drive a screw (50) and a motor (37) coupled with the driver bit (20), the controller (100) including:
an acquirer (151) configured to acquire torque values of a torque generated in the motor (37);
a calculator (152) configured to calculate a standard deviation of the torque values acquired in a temporary tightening period from when the screw (50) engages with a screw hole (72) until when the screw (50) is seated in the screw hole (72); and
a determiner (153) configured to determine that there is an abnormality when a ratio of the standard deviation to a reference standard deviation exceeds a first threshold value.

Configuration 12

A non-transitory storage medium configured to store a control program causing one or more processors of a computer connected to an actuator (10) including a driver bit (20) configured to rotationally drive a screw (50) and a motor (37) coupled with the driver bit (20), when executed by the one or more processors,
to acquire torque values of a torque generated in the motor (37),
to calculate a standard deviation of the torque values acquired in a temporary tightening period from when the screw (50) engages with a screw hole (72) until when the screw (50) is seated in the screw hole (72), and
to determine that there is an abnormality when a ratio of the standard deviation to a reference standard deviation exceeds a first threshold value.

H. Advantages

The embodiment can more reliably detect a screw tightening abnormality in the operation of tightening a screw to a workpiece or the like by using a robot or a screw tightening device. It is therefore possible to reduce breakage of the screw or the workpiece due to failure in tightening the screw. In addition, when the screw tightening abnormality is detected, the tightening can be more reliably achieved by redoing the screw tightening operation.

Although the embodiment of the present invention has been described above, it should be understood that the embodiment disclosed herein is illustrative in all respects and not restrictive. The scope of the present invention is indicated by the claims, and it is intended that all modifications within the meaning and scope of the claims are included in the present invention.

What is claimed is:

1. A screw tightening system comprising:
an actuator including a driver bit configured to rotationally drive a screw, a motor coupled with the driver bit, a driver configured to drive the motor, and a load sensor configured to detect an axial load on the driver bit; and
a controller configured to control the actuator,
wherein:
the driver is configured to calculate a torque value of a torque generated in the motor,
the controller includes:
an acquirer configured to acquire torque values of the torque from the driver,
a calculator configured to calculate a standard deviation of the torque values acquired in a temporary tightening period from when the screw engages with a screw hole until when the screw is seated in the screw hole, and
a determiner configured to determine that there is an abnormality when a ratio of the standard deviation to a reference standard deviation exceeds a first threshold value, and
the determiner is configured to determine that there is an abnormality when the ratio does not exceed the first threshold value and the axial load detected by the load sensor exceeds a second threshold value.

2. The screw tightening system according to claim 1, wherein the controller further includes a commander configured to command the motor to stop when is the determiner determines that there is an abnormality.

3. The screw tightening system according to claim 1, wherein
the acquirer is configured to acquire the torque values at a predetermined cycle from the driver, and
the calculator is configured to start calculation of the standard deviation when the torque value is acquired a first predetermined number of times or more in the temporary tightening period.

4. The screw tightening system according to claim 3, wherein the calculator is configured to calculate the standard deviation by using the torque values acquired for all number of times from a start of the temporary tightening period to a present time.

5. The screw tightening system according to claim 3, wherein the calculator is configured to calculate the standard deviation by using the torque values for a latest second predetermined number of times.

6. The screw tightening system according to claim 1, wherein the reference standard deviation is calculated based on the torque values acquired by the acquirer for all number of times in the temporary tightening period when the screw is considered to be normally tightened to the screw hole.

7. The screw tightening system according to claim 1, wherein the reference standard deviation is an average value of standard deviations each of which is calculated based on the torque values acquired by the acquirer for a predetermined number of times in the temporary tightening period when the screw is considered to be normally tightened to the screw hole.

8. The screw tightening system according to claim 1, wherein the determiner is configured to select one from a plurality of reference standard deviations depending on at least one of a size of the screw, a material of the screw, and a material of the screw hole.

9. The screw tightening system according to claim 1, wherein the determiner is configured to select one from a plurality of first threshold values depending on at least one of the size of the screw, the material of the screw, and the material of the screw hole.

10. A controller configured to control an actuator including a driver bit configured to rotationally drive a screw, a motor coupled with the driver bit, and a driver configured to drive the motor and calculate a torque value of a torque generated in the motor, the controller comprising:
an acquirer configured to acquire torque values of the torque from the driver;
a calculator configured to calculate a standard deviation of the torque values acquired in a temporary tightening period from when the screw engages with a screw hole until when the screw is seated in the screw hole; and
a determiner configured to determine that there is an abnormality when a ratio of the standard deviation to a reference standard deviation exceeds a first threshold value,
wherein:
the actuator includes a load sensor configured to detect an axial load on the driver bit and
the determiner is configured to determine that there is an abnormality when the ratio does not exceed the first threshold value and the axial load detected by the load sensor exceeds a second threshold value.

11. A non-transitory storage medium configured to store a control program which when accessed and executed by one or more processors of a computer that is connected to an actuator including a driver bit configured to rotationally drive a screw, a motor coupled with the driver bit, a driver configured to drive the motor and calculate a torque value of a torque generated in the motor, and a load sensor configured to detect an axial load on the driver bit, is configured to cause the one or more processors to:
acquire torque values of the torque from the driver,
calculate a standard deviation of the torque values acquired in a temporary tightening period from when the screw engages with a screw hole until when the screw is seated in the screw hole,
determine that there is an abnormality when a ratio of the standard deviation to a reference standard deviation exceeds a first threshold value, and
determine that there is an abnormality when the ratio does not exceed the first threshold value and the axial load detected by the load sensor exceeds a second threshold value.

* * * * *